US010157616B2

(12) United States Patent
Agarwal et al.

(10) Patent No.: US 10,157,616 B2
(45) Date of Patent: Dec. 18, 2018

(54) METHODS AND APPARATUS FOR POST-PROCESSING SPEECH RECOGNITION RESULTS OF RECEIVED RADIO VOICE MESSAGES ONBOARD AN AIRCRAFT

(71) Applicant: HONEYWELL INTERNATIONAL INC., Morris Plains, NJ (US)

(72) Inventors: Jitender Kumar Agarwal, UttarPradesh (IN); Vasantha Selvi Paulraj, Karnataka (IN); Kiran Gopala Krishna, Karnataka (IN); Chaya Garg, Plymouth, MN (US); Roger W. Burgin, Scottsdale, AZ (US); Robert E De Mers, Nowthen, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 94 days.

(21) Appl. No.: 15/382,939

(22) Filed: Dec. 19, 2016

(65) Prior Publication Data
US 2018/0174588 A1 Jun. 21, 2018

(51) Int. Cl.
| | |
|---|---|
| G10L 15/00 | (2013.01) |
| G10L 15/26 | (2006.01) |
| G10L 25/69 | (2013.01) |
| G10L 15/01 | (2013.01) |
| G08G 5/00 | (2006.01) |

(Continued)

(52) U.S. Cl.
CPC .............. *G10L 15/26* (2013.01); *G06F 3/16* (2013.01); *G08G 5/0013* (2013.01); *G08G 5/0021* (2013.01); *G10L 15/01* (2013.01); *G10L 15/22* (2013.01); *G10L 15/30* (2013.01);
(Continued)

(58) Field of Classification Search
None
See application file for complete search history.

(56) References Cited

U.S. PATENT DOCUMENTS 7,809,405 B1 * 10/2010 Rand .................... G08G 5/0013
455/431
7,881,832 B2 2/2011 Komer et al.
(Continued)

FOREIGN PATENT DOCUMENTS

WO 2016037204 A1 3/2016

OTHER PUBLICATIONS

Extended European Search Report for Application No. 17206007.1 dated May 11, 2018.

*Primary Examiner* — Richard Z Zhu
(74) *Attorney, Agent, or Firm* — Lorenz & Kopf, LLP (57) ABSTRACT

A method for displaying received radio voice messages onboard an aircraft is provided. The method post-processes, by at least one processor onboard the aircraft, a set of speech recognition (SR) hypothetical data to increase accuracy of an associated SR system, by: obtaining, by the at least one processor, secondary source data from a plurality of secondary sources; comparing, by the at least one processor, the set of SR hypothetical data to the secondary source data; and identifying, by the at least one processor, an aircraft tail number using the set of SR hypothetical data and the secondary source data; identifies, by the at least one processor, a subset of the received radio voice messages including the tail number; and presents, via a display device onboard the aircraft, the subset using distinguishing visual characteristics.

13 Claims, 4 Drawing Sheets

(51) Int. Cl.
  *G10L 15/22* (2006.01)
  *G06F 3/16* (2006.01)
  *G10L 15/30* (2013.01)
  *G10L 25/51* (2013.01)

(52) U.S. Cl.
  CPC .............. *G10L 25/51* (2013.01); *G10L 25/69* (2013.01); *G10L 2015/221* (2013.01); *G10L 2015/228* (2013.01)

(56) References Cited

U.S. PATENT DOCUMENTS

| | | | |
|---|---|---|---|
| 7,912,592 B2 | 3/2011 | Komer et al. | |
| 9,230,549 B1 | 1/2016 | Popik et al. | |
| 9,446,852 B2* | 9/2016 | Lacko | B64D 45/00 |
| 9,747,898 B2* | 8/2017 | Ng-Thow-Hing | G10L 15/20 |
| 2006/0058947 A1* | 3/2006 | Schalk | G01C 21/3608 |
| | | | 701/427 |
| 2007/0189328 A1* | 8/2007 | Judd | G10L 15/26 |
| | | | 370/466 |
| 2008/0045198 A1* | 2/2008 | Bhogal | G08G 5/0013 |
| | | | 455/414.4 |
| 2008/0144638 A1* | 6/2008 | Bay | H04B 7/18506 |
| | | | 370/401 |
| 2010/0027768 A1* | 2/2010 | Foskett | G08G 5/0013 |
| | | | 379/88.14 |
| 2011/0125503 A1* | 5/2011 | Dong | G10L 15/22 |
| | | | 704/275 |
| 2012/0022774 A1 | 1/2012 | Pinheiro et al. | |
| 2013/0033387 A1 | 2/2013 | Trope | |
| 2014/0025381 A1* | 1/2014 | Wang | G10L 25/69 |
| | | | 704/260 |
| 2015/0081292 A1 | 3/2015 | Populus et al. | |
| 2016/0101855 A1* | 4/2016 | Stefani | G08G 5/0008 |
| | | | 701/2 |

* cited by examiner

METHODS AND APPARATUS FOR POST-PROCESSING SPEECH RECOGNITION RESULTS OF RECEIVED RADIO VOICE MESSAGES ONBOARD AN AIRCRAFT

TECHNICAL FIELD

Embodiments of the subject matter described herein relate generally to post-processing speech recognition data for increased accuracy. More particularly, embodiments of the subject matter relate to using secondary sources for post-processing recognized radio communications onboard an aircraft.

BACKGROUND

Radio communications received onboard a first aircraft may include all communications transmitted from ground control to a plurality of aircraft that includes the first aircraft. Although flight crew members may benefit from transcription aids which interpret the ground control audio content carried by communication radios onboard the aircraft, displayed transcriptions of these radio communications generally include communications directed to the plurality of aircraft. In this way, the first aircraft receives a significant number of radio communications and transcriptions of radio communications which are not applicable to its own operations.

Accordingly, it is desirable to provide a method for identifying and presenting communications that are directed to one particular aircraft. In addition, it is desirable to provide increased accuracy for recognized radio communications onboard an aircraft. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for displaying received radio voice messages onboard an aircraft. The method post-processes, by at least one processor onboard the aircraft, a set of speech recognition (SR) hypothetical data to increase accuracy of an associated SR system, by: obtaining, by the at least one processor, secondary source data from a plurality of secondary sources; comparing, by the at least one processor, the set of SR hypothetical data to the secondary source data; and identifying, by the at least one processor, an aircraft tail number using the set of SR hypothetical data and the secondary source data; identifies, by the at least one processor, a subset of the received radio voice messages including the tail number; and presents, via a display device onboard the aircraft, the subset using distinguishing visual characteristics.

Some embodiments disclose a system for displaying radio voice messages received onboard an aircraft. The system includes: system memory; an aircraft onboard radio, configured to receive the radio voice messages onboard the aircraft; a display device, configured to present transcriptions of the radio voice messages received onboard the aircraft; and at least one processor, communicatively coupled to the system memory, the aircraft onboard radio, and the display device, the at least one processor configured to: perform post-processing for a set of speech recognition (SR) hypothetical data to increase accuracy of an associated SR system, by: obtaining secondary source data from a plurality of secondary sources; comparing the set of SR hypothetical data to the secondary source data; and identifying an aircraft tail number using the set of SR hypothetical data and the secondary source data; identify a subset of the received radio voice messages including the tail number; and initiate presentation, via the display device, of the subset using distinguishing visual characteristics.

Some embodiments provide a non-transitory, computer-readable medium containing instructions thereon, which, when executed by a processor, perform a method. The method receives a radio communication onboard a first aircraft, the radio communication comprising a set of speech recognition data; compares the set of speech recognition data to a stored identifier for the first aircraft; determines a confidence level associated with accuracy of the set of SR hypothetical data; and when the confidence level is not greater than a predetermined threshold, performing post-processing of the set of speech recognition data by: obtaining secondary source data associated with a plurality of aircraft comprising at least the first aircraft; comparing the speech recognition data to the secondary source data; identifying the stored identifier, based on the comparing; and determining that the radio communication is associated with the first aircraft, based on identifying the stored identifier; and presents, via a display device onboard the aircraft, a plurality of radio communications associated with the first aircraft using distinguishing visual characteristics, wherein the plurality of radio communications comprises the radio communication.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods for identifying a subset of broadcast radio messages (i.e., radio voice messages) received onboard an aircraft that are directed to the aircraft, and presenting these relevant broadcast radio messages using distinguishing visual characteristics. More specifically, the subject matter relates to post-processing interpreted speech data associated with each radio message, when a confidence level of the interpreted speech data does not exceed a predetermined threshold, in order to identify a match with more accuracy than that presented by conventional speech recognition methods. Thus, the present disclosure provides methods and apparatus used by a first aircraft to determine whether a particular broadcast radio message is directed to the first aircraft, or is directed to another aircraft.

Certain terminologies are used with regard to the various embodiments of the present disclosure. Radio messages (i.e., radio voice messages) may include any transmitted audible communication received onboard an aircraft. Radio messages are generally received via a radio frequency device, but may also be received via cellular communication device (e.g., cellular phone), aircraft onboard transponder device, and/or any other communication device capable of receiving voice communications. Automatic speech recognition (i.e., "interpretation") may include any commonly known and used speech recognition algorithm which interprets the received radio messages to identify articulated words or phrases of the radio messages.

Figure 1:
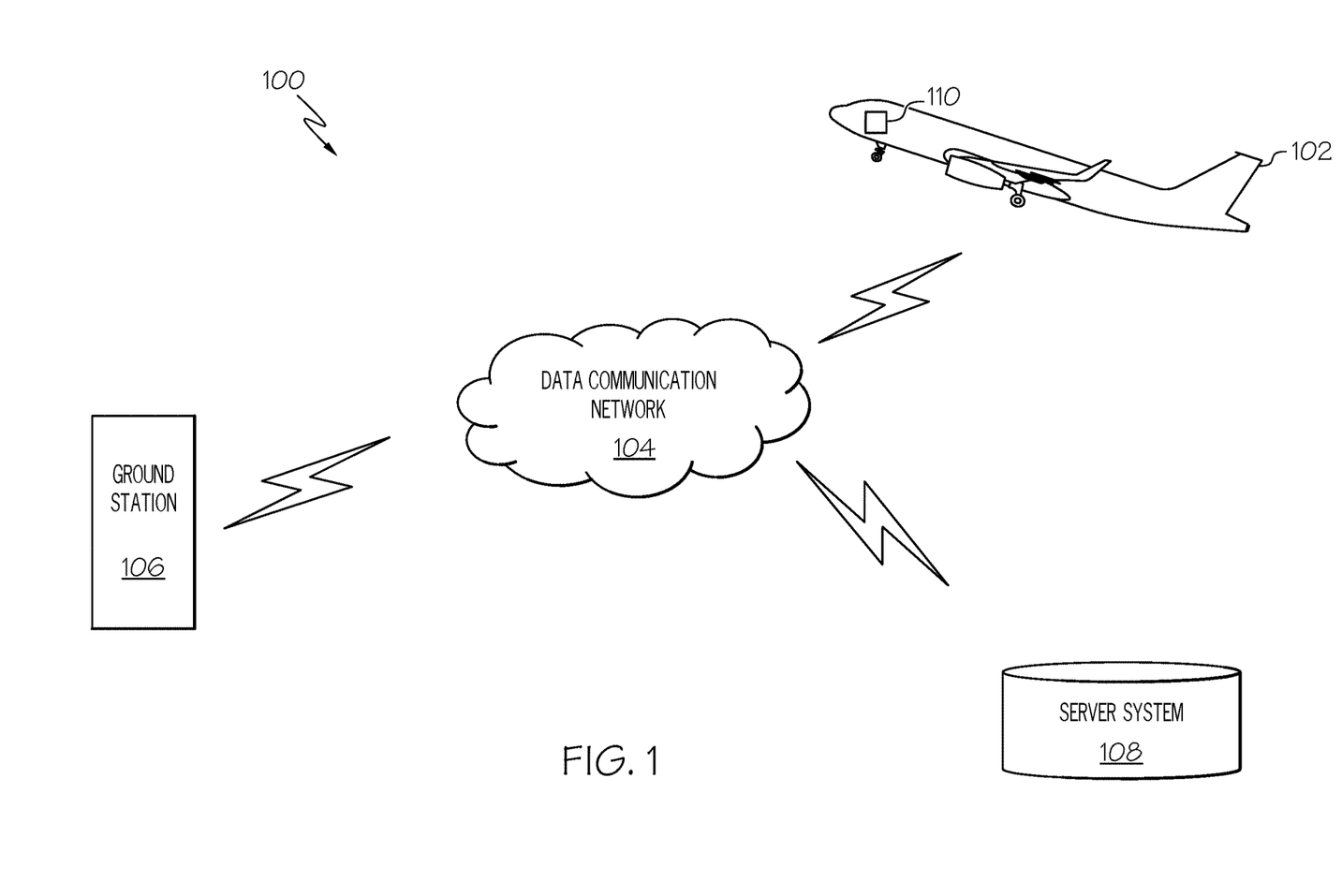
FIG. 1 is a diagram illustrating operation of a radio communication post-processing system onboard an aircraft, in accordance with the disclosed embodiments.

Turning now to the figures, FIG. 1 is a diagram illustrating operation 100 of a radio communication post-processing system onboard an aircraft 102, in accordance with the disclosed embodiments. The aircraft 102 may be any aviation vehicle that receives radio communications from a ground station 106, as described below. The aircraft 102 may be implemented as an airplane, helicopter, spacecraft, hovercraft, or the like. The ground station 106 is generally an air traffic control (ATC) tower, an airport, or any other entity that communicates with the aircraft 102 via one or more radio communication devices.

The aircraft 102 includes an onboard server 110, and the aircraft 102 is capable of communicating with a remotely located server system 108 via a data communication network 104. The onboard server 110 is generally located inside the aircraft 102, and the aircraft 102 and the server system 108 are generally disparately located. Each of the onboard server 110 and the server system 108 may include any number of application servers, and each server may be implemented using any suitable computer. In some embodiments, the onboard server 110 and/or the server system 108 includes one or more dedicated computers. In some embodiments, the onboard server 110 and/or the server system 108 includes one or more computers carrying out other functionality in addition to server operations.

The server system 108 is configured to store and provide secondary source data associated with aircraft traffic (e.g., Aircraft Situation Display to Industry (ASDI) data, Traffic Information Service-Broadcast (TIS-B) data, Automatic Dependent Surveillance-Broadcast (ADS-B) Traffic data). The onboard server 110 is configured to store and provide ASDI historic data, one or more FAA databases, one or more airline databases, and data associated with the aircraft 102 itself. In certain embodiments, data associated with the onboard server 110 is loaded into the onboard server 110 when the aircraft 102 is on the ground, prior to flight. The onboard server 110 is configured to operate without connection to the remotely located server system 108, during flight, as needed.

As noted above, the aircraft 102 communicates with the server system 108 via the data communication network 104. In practice, the data communication network 104 may be any digital or other communications network capable of transmitting messages or data between devices, systems, or components. In certain embodiments, the data communication network 104 includes a packet switched network that facilitates packet-based data communication, addressing, and data routing. The packet switched network could be, for example, a wide area network, the Internet, a satellite uplink, or the like. In various embodiments, the data communication network 104 includes any number of public or private data connections, links or network connections supporting any number of communications protocols. The data communication network 104 may include the Internet, for example, or any other network based upon Transmission Control Protocol/Internet Protocol (TCP/IP) or other conventional protocols. In various embodiments, the data communication network 104 could also incorporate a wireless and/or wired telephone network, such as a cellular communications network for communicating with mobile phones, personal digital assistants, and/or the like. The data communication network 104 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

During normal operation, the ground station 106 communicates with multiple aircraft within communication range, including the aircraft 102. The ground station 106 transmits these messages via radio communication devices, and the messages are received via one or more radio communication devices onboard the aircraft 102. The aircraft 102 uses speech recognition technology onboard the aircraft to interpret and transcribe the received radio messages, and presents each transcribed message that is directed to the aircraft 102 using differing visual characteristics such that these radio communications applicable to the aircraft 102 are distinguishable from messages directed to others. To accomplish this, the aircraft 102 interprets and recognizes an aircraft identifier in each message, and when that identifier corresponds to the aircraft 102, then the particular radio message that includes the identifier is determined to be directed to the aircraft 102 and is presented accordingly.

However, in certain circumstances, a radio communication from the ground station 106 may not include a full identifier (i.e., the identifier was not interpreted in full or was "cut off"), or the speech recognition device may be unable to interpret the identifier correctly. In this scenario, the aircraft 102 is unable to distinguish which messages are directed to the aircraft 102, and which messages are directed to another aircraft within communication range of the ground station 106. In this case, the aircraft 102 uses data from secondary sources, such as the server system 108, to perform post-processing on the speech recognition results (i.e., speech recognition (SR) hypothetical data), in order to more accurately identify radio communication messages directed to the aircraft 102.

Figure 2:
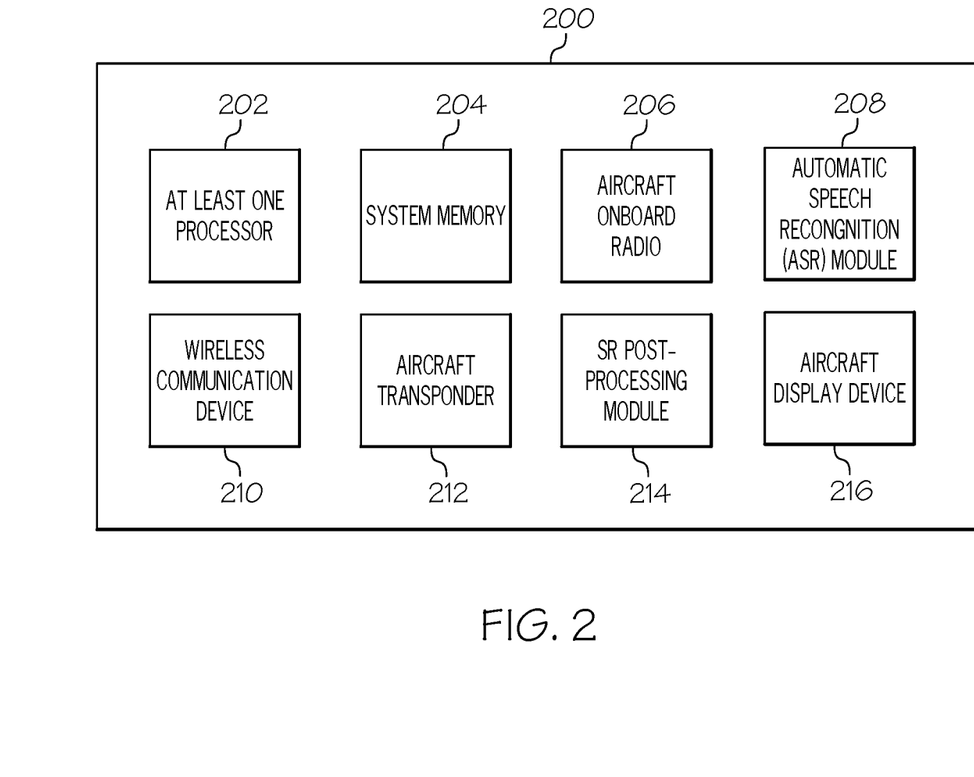
FIG. 2 is a functional block diagram of a radio communication post-processing system onboard an aircraft, in accordance with the disclosed embodiments.

FIG. 2 is a functional block diagram of a radio communication post-processing system 200 onboard an aircraft, in accordance with the disclosed embodiments. It should be appreciated that the radio communication post-processing system 200 is used onboard an aircraft and as part of a communication system shown in FIG. 1, and includes additional detail. In practice, an embodiment of the radio communication post-processing system 200 may include additional or alternative elements and components, as desired for the particular application. For example, additional components such as user input components may be employed without departing from the scope of the present disclosure.

The radio communication post-processing system 200 generally includes, without limitation: at least one processor 202; a system memory 204 element; at least one aircraft onboard radio 206; an automatic speech recognition device 208; a wireless communication device 210; an aircraft transponder 212; a speech recognition (SR) post-processing module 214; and an aircraft display device 216. These elements and features of the radio communication post-processing system 200 may be operatively associated with one another, coupled to one another, or otherwise configured to cooperate with one another as needed to support the desired functionality—in particular, performing post-processing of interpreted radio communications, as described herein. For ease of illustration and clarity, the various physical, electrical, and logical couplings and interconnections for these elements and features are not depicted in FIG. 2. Moreover, it should be appreciated that embodiments of the radio communication post-processing system 200 will include other elements, modules, and features that cooperate to support the desired functionality. For simplicity, FIG. 2 only depicts certain elements that relate to the post-processing techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 communicates with the system memory 204 element. The system memory 204 may be used to store speech recognition algorithms, interpreted speech data, secondary source data, or other datasets applicable to post-processing a set of interpreted speech data associated with one or more received broadcast radio messages. In exemplary embodiments of the present disclosure, the at least one processor 202 and the system memory 204 are implemented as an aircraft onboard server. In this embodiment, the aircraft onboard server is configured to store ASDI historic data, one or more FAA databases, one or more airline databases, and data associated with the aircraft itself.

The system memory 204 may be realized using any number of devices, components, or modules, as appropriate to the embodiment. Moreover, the at least one processor 202 could include system memory 204 integrated therein and/or system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the radio communication post-processing system 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The at least one aircraft onboard radio 206 is suitably configured to receive radio frequency communications from a ground station, an airport, and other aircraft. Such radio frequency communications are received in audio format, and are interpreted by the automatic speech recognition device 208. In exemplary embodiments of the present disclosure, the at least one aircraft onboard radio 206 is a conventional aircraft radio, which uses Very High Frequency (VHF), High Frequency (HF), satellite communications (SATCOM), and/or Voice Over Internet Protocol (VOIP) technology. In exemplary embodiments, the aircraft onboard radio 206 uses VHF radio technology.

The automatic speech recognition module 208 performs basic speech recognition operations to interpret radio communications received by the aircraft onboard radio 206. The automatic speech recognition module 208 generates speech recognition (SR) results, which may be further processed (e.g., post-processing) to increase accuracy of the interpreted SR results. For this purpose, the automatic speech recognition module 208 uses conventional speech recognition techniques, which will not be described here. The automatic speech recognition module 208 is further configured to transcribe recognized speech data, and to present the transcriptions via the aircraft display device 216. The automatic speech recognition module 208 may work cooperatively with additional speech recognition components and/or hardware, such as Digital Signal Processing (DSP) components, Field Programmable Gate Array (FPGA) components, and/or Graphics Processing Unit (GPU) components.

The wireless communication device 210 is suitably configured to transmit signals from the radio communication post-processing system 200 and to receive data transmissions from at least a remote server system and/or an onboard server system (see reference 108, FIG. 1). As described in more detail herein, data received by the wireless communication device 210 includes secondary source data, which may include, without limitation: pre-recorded and readily available databases, real-time data feeds to the aircraft, data stored on a remote server and/or onboard server communicatively coupled to one or more systems onboard the aircraft, or the like. Data provided by the wireless communication device 210 may include, without limitation: requests for secondary source data stored by the remote server system and/or onboard server system, or the like. The wireless communication device 210 is compatible with communication protocol described previously (see reference 104, FIG. 1), and may leverage conventional design concepts that need not be described in detail here.

The aircraft transponder 212 is configured to send and receive broadcast messages via transponder data link. The aircraft transponder 212 may be implemented using any transponder device which may transmit broadcast messages which may be received by other aircraft and/or a ground control center within a range of communication. Exemplary embodiments of the aircraft transponder 212 may be implemented using an Automatic Dependent Surveillance-Broadcast (ADS-B), including an ADS-B Out transmitter and an ADS-B In receiver. The ADS-B Out transmitter (located onboard the aircraft) periodically broadcasts information about each aircraft, to include, without limitation: aircraft identification, current aircraft position, altitude, and/or velocity. The ADS-B Out broadcast messages of a plurality of aircraft around a particular airport and/or a particular runway (as described above with regard to FIG. 1) provide real-time position information, which may be received via an ADS-B In receiver of a first aircraft using the radio communication post-processing system 200. The first aircraft may retain, store, and interpret the received ADS-B messages to identify other aircraft identifiers (e.g., aircraft tail numbers) associated with other aircraft in operation in the vicinity of ground control. The aircraft transponder 212 may receive transponder messages transmitted from other aircraft and/or a ground control station within transmission range. In other words, the aircraft transponder 212 may receive transponder messages via aircraft-to-aircraft communication and/or ground control-to-aircraft communication.

The speech recognition (SR) post-processing module 214 is suitably configured to perform post-processing operations on speech recognition data (i.e., speech recognition (SR) hypothetical data) obtained by the automatic speech recognition device 208. Such post-processing operations increase the accuracy of the speech recognition result by using secondary data sources to identify an aircraft to which a particular radio communication message is directed.

In practice, the automatic speech recognition module 208 and/or the SR post-processing module 214 may be implemented with (or cooperate with) the at least one processor 202 to perform at least some of the functions and operations described in more detail herein. In this regard, the automatic speech recognition module 208 and/or the SR post-processing module 214 may be realized as suitably written processing logic, application program code, or the like.

The aircraft display device 216 is configured to display various icons, text, and/or graphical elements associated with transcribed radio communications, secondary data, or the like. In an exemplary embodiment, the aircraft display device 216 is realized as an electronic display configured to graphically display transcriptions of radio communications that have been interpreted using automatic speech recognition (ASR). In some embodiments, the aircraft display device 216 is located within a cockpit of the aircraft. It will be appreciated that although the aircraft display device 216 may be implemented using a single aircraft display device 216, certain embodiments may use additional display devices to accomplish the functionality of the aircraft display device 216 described herein.

Figure 3:
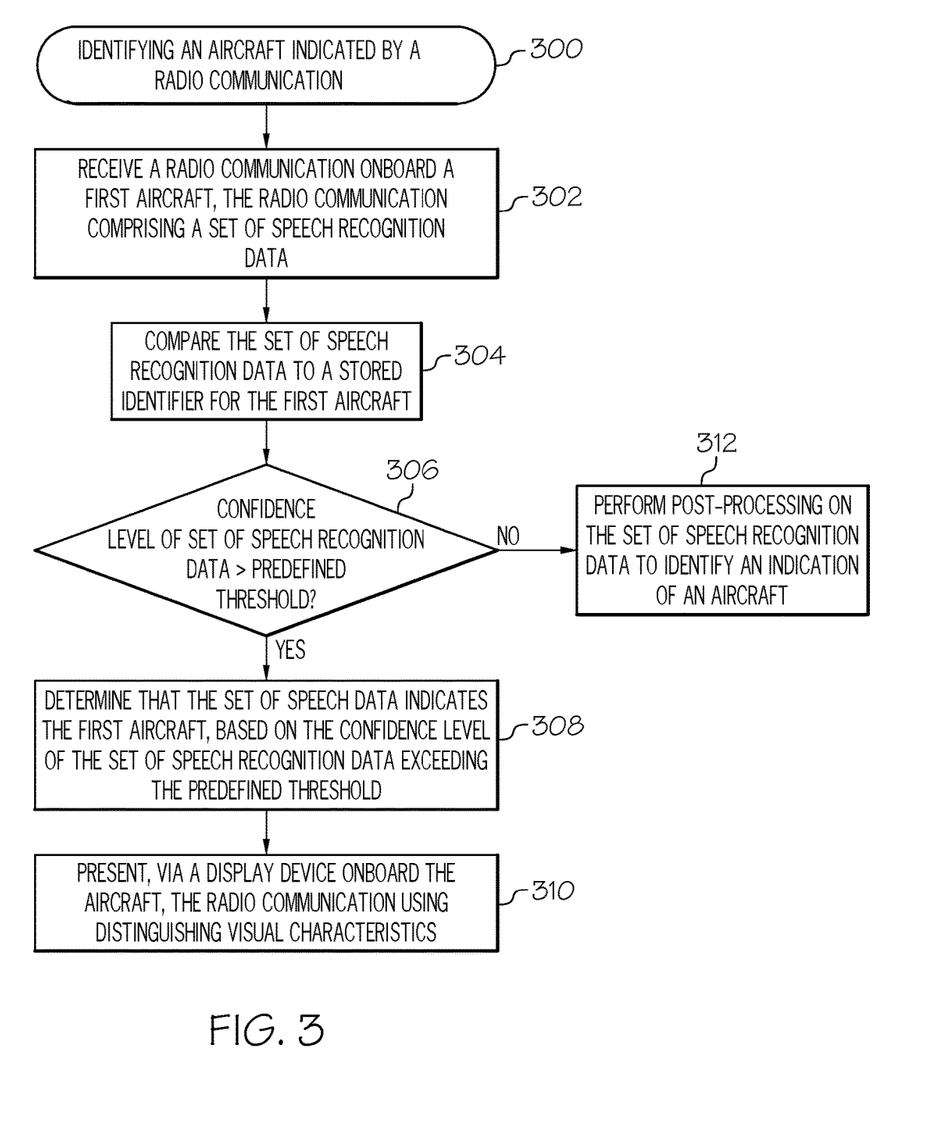
FIG. 3 is a flow chart that illustrates an embodiment of a process for identifying an aircraft indicated by a particular radio communication.

FIG. 3 is a flow chart that illustrates an embodiment of a process 300 for identifying an aircraft indicated by a particular radio communication. The various tasks performed in connection with process 300 may be performed by software, hardware, firmware, or any combination thereof. For illustrative purposes, the following description of process 300 may refer to elements mentioned above in connection with FIGS. 1-2. In practice, portions of process 300 may be performed by different elements of the described system. It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

For ease of description and clarity, it is assumed that the process 300 begins by receiving a radio communication onboard a first aircraft, the radio communication comprising a respective set of speech recognition data (step 302). Generally, radio communications are received onboard the aircraft continuously, and the received radio communications may be directed to any one of a plurality of aircraft located within a communication range of the transmitting party. The transmitting party may be an airport, air traffic control (ATC), other aircraft, or any other party within a communication range of the aircraft and using communication hardware compatible with communication hardware onboard the aircraft. Each of the radio communications, once received onboard the aircraft, is interpreted using conventional speech recognition techniques, such as Automatic Speech Recognition (ASR), and the process 300 receives the interpreted radio communications in the form of speech recognition data.

Next, the process 300 compares the set of speech recognition data to stored identifying data (i.e., a stored identifier) for the first aircraft (step 304), and determines whether the accuracy of the set of speech recognition data is greater than a predefined threshold (decision 306). The set of speech recognition data includes a stored identifier and a message following the stored identifier. Each aircraft is associated with an identifier that is specific to that particular aircraft, and the aircraft identifier is stored for comparison and further analysis. The stored identifier for the aircraft may be implemented as an N-number, tail number, call sign, flight identifier, or any other classification or label that is associated with a single, individual aircraft. In some embodiments, the stored identifier may also include added keywords that denote an aircraft manufacturer name or category. The message following the stored identifier includes the substance of the communication, such as a statement, query, acknowledgement, or the like.

Here, the process 300 determines accuracy of the interpreted set of speech recognition data by computing a confidence level for the set of speech recognition data, including the identifier and message following the stored identifier. When the confidence level exceeds the predetermined threshold, then the process 300 determines that the set of speech data indicates the first aircraft (step 308) and the process 300 presents, via a display device onboard the aircraft, the radio communication using distinguishing visual characteristics (step 310). This particular radio message that is directed to the first aircraft is a subset of the group of received broadcast radio messages, which may be directed to any of the aircraft within a communication range of the third party transmitting the broadcast radio messages. The process 300 presents this particular radio message using distinguishing visual characteristics such that a flight crew may easily recognize relevant messages that are directly applicable to the first aircraft and its operations. Distinguishing visual characteristics may include, without limitation: different colors, highlighting, underlining, text formatting (e.g., bold text, italicized text), flashing effects, and/or any other visual effect which may differentiate radio communications directed to, and therefore relevant to, the first aircraft.

However, when the confidence level does not exceed the predetermined threshold, then the process 300 performs post-processing on the set of speech recognition data to make a more accurate determination of which aircraft is indicated by the radio communication (step 312). In certain embodiments, the confidence level may be low (e.g., lower than the predetermined threshold), which indicates that the set of speech recognition data does not indicate the first aircraft. However, this may be in error. There are situations in which the complete stored identifier associated with the first aircraft may legitimately be absent from the received radio communication, resulting in a confidence level lower than the predetermined threshold. For example, the received radio communication may have been clipped or cut-off, thereby excluding part of the stored identifier from the received communication. As another example, the transmitting party may have articulated a partial identifier, such as a shortcut or nickname for the first aircraft instead of the entire identifier associated with the first aircraft. When either of these situations occur, the process 300 performs post-processing (step 312). One suitable methodology for performing post-processing is described below with reference to FIG. 4.

Figure 4:
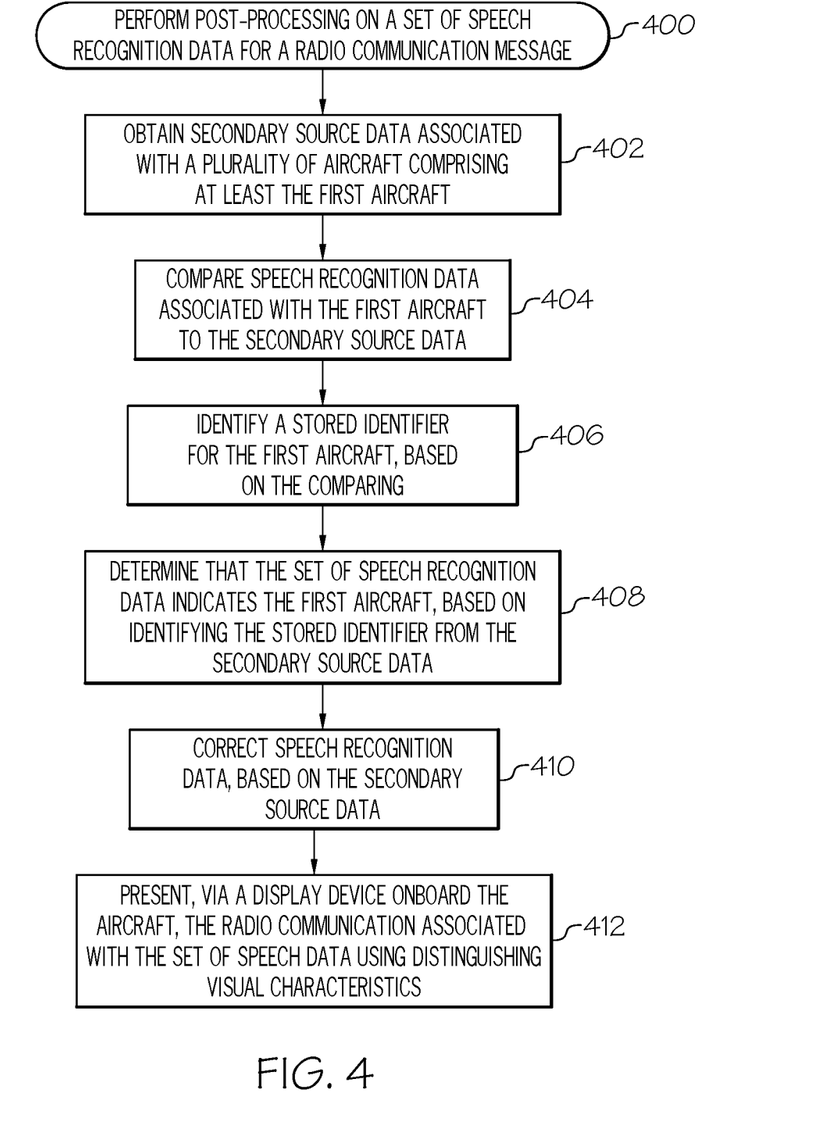
FIG. 4 is a flow chart that illustrates an embodiment of a process for performing post-processing of a set of speech recognition data for a radio communication message.

FIG. 4 is a flow chart that illustrates an embodiment of a process 400 for performing post-processing of a set of speech recognition data for a radio communication message. It should be appreciated that the process 400 described in FIG. 4 represents one embodiment of step 312 described above in the discussion of FIG. 3, including additional detail.

First, the process 400 obtains secondary source data associated with a plurality of aircraft comprising at least the first aircraft (step 402). In certain embodiments, the secondary source data is obtained via a communication connection established between one or more computer systems onboard the aircraft and one or more remote servers and/or aircraft onboard servers. In some embodiments, the secondary source data is obtained via aircraft transponder. Secondary source data may include, without limitation: pre-recorded and readily available databases, real-time data feeds to the aircraft, and data stored on a remote server and/or aircraft onboard server communicatively coupled to one or more systems onboard the aircraft.

Pre-recorded and readily available databases may include, without limitation: one or more airline databases that include an airline code mapped to the airline name; Aircraft Situation Display to Industry (ASDI) derived historic data, including a registration number, call sign, departure airport, destination airport, estimated time of departure, and estimated time of arrival, for aircraft associated with a particular airport; a Federal Aviation Administration (FAA) registration database that includes registration details of a plurality of aircraft (e.g., N-numbers); and an FAA manufacturer database, which includes manufacturer name and make and model of each aircraft.

Real-time data feeds to the aircraft may include, without limitation: Aircraft Situation Display to Industry (ASDI) data feeds, which include flight plan data, flight plan amendment data, departure data, tracking information, boundary crossing data, flight management information, an oceanic report, arrival data, and flight plan cancellation data; Automatic Dependent Surveillance-Broadcast (ADS-B) data, which includes current aircraft traffic information, such as a transponder code for traffic, a flight identification, a flight category, and aircraft position reports; Traffic Information Service-Broadcast (TIS-B) data; Aircraft Communications Addressing and Reporting System (ACARS) data; Notice to Airmen (NOTAM) data; and Automatic Terminal Information Service (ATIS) data.

Next, the process 400 compares speech recognition data associated with the first aircraft to the secondary source data (step 404). In certain embodiments, the process 400 compares a partial identifier (which was obtained from a radio communication that has been interpreted using speech recognition) to a plurality of aircraft identifiers found in secondary source data, to locate a match. The process 400 then identifies a stored identifier for the first aircraft, based on the comparing (step 406). Here, the process 400 evaluates secondary source data that is associated with a plurality of aircraft operating in the area and locates a partial or full match of the stored identifier in the secondary source data.

Next, the process 400 determines that the set of speech recognition data indicates the first aircraft, based on identifying the stored identifier from the secondary source data (step 408). After determining that the set of speech recognition data indicates the first aircraft (step 408), the process 400 corrects the speech recognition data, based on the secondary source data (step 410). The set of speech recognition data includes the stored identifier and a substantive message, as described previously with regard to FIG. 3. Here, the process 400 identifies the stored identifier using the secondary source data (step 408) and then corrects the message following the stored identifier (step 410). In some embodiments, the process 400 also uses aircraft onboard databases and a real-time data feed of aircraft parameters to correct the message following the stored identifier.

The process 400 then presents, via a display device onboard the aircraft, the radio communication associated with the set of speech data using distinguishing visual characteristics (step 412). This particular radio message that is directed to the first aircraft is a subset of the group of received broadcast radio messages, which may be directed to any of the aircraft within a communication range of the third party transmitting the broadcast radio messages. The process 400 presents this particular radio message using distinguishing visual characteristics such that a flight crew may easily recognize relevant messages that are directly applicable to the first aircraft and its operations. Distinguishing visual characteristics may include, without limitation: different colors, highlighting, underlining, text formatting (e.g., bold text, italicized text), flashing effects, and/or any other visual effect which may differentiate radio communications directed to, and therefore relevant to, the first aircraft.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for displaying received radio voice messages onboard an aircraft, the method comprising:
   receiving, via a radio onboard the aircraft, a plurality of ground control messages comprising speech data; and
   processing the speech data using a speech recognition (SR) device onboard the aircraft, to generate SR results, by at least one processor onboard the aircraft;
   comparing a set of SR hypothetical data to stored identifying information associated with the aircraft, the set of SR hypothetical data comprising the SR results for the plurality of ground control messages received onboard the aircraft;
   determining a confidence level associated with accuracy of the set of SR hypothetical data;
   when the confidence level is not greater than a predetermined threshold,
      determining that one of the plurality of ground control messages comprises a received radio communication including a partial identifier for the aircraft; and
      post-processing the set of speech recognition (SR) hypothetical data to increase accuracy of the SR device, by the at least one processor, wherein the post-processing is performed by:
         obtaining, by the at least one processor, secondary source data from a plurality of secondary sources, wherein the secondary source data comprises at least one of airline databases including an airline code mapped to a corresponding airline name, Aircraft Situation Display to Industry (ASDI) derived historic data, a regulatory registration database, a manufacturer database, ASDI real-time data feeds to the aircraft, Automatic Dependent Surveillance-Broadcast (ADS-B) data received by the aircraft, Traffic Information Service-Broadcast (TIS-B) data, Aircraft Communications Addressing and Reporting System (ACARS) data, Notices to Airmen (NOTAM) data, and Automatic Terminal Information Service (ATIS) data;

comparing the set of SR hypothetical data including the partial identifier to a plurality of aircraft identifiers found in the secondary source data, by the at least one processor;

identifying, by the at least one processor, one of the plurality of aircraft identifiers using the set of SR hypothetical data and the secondary source data;

determining that the set of SR hypothetical data including the partial identifier indicates the aircraft, by the at least one processor; and correcting the set of SR hypothetical data corrects the set of SR hypothetical data including the partial identifier, based on the secondary source data, to generate a corrected set of SR hypothetical data;

presenting transcriptions of the plurality of ground control messages received onboard the aircraft, wherein the plurality of ground control messages are directed to a set of aircraft including at least the aircraft;

identifying, by the at least one processor, a subset of the plurality of ground control messages including the one of the plurality of aircraft identifiers that indicates the aircraft; and presenting, via a display device onboard the aircraft, the subset using distinguishing visual characteristics, such that the subset of the plurality of ground control messages applicable to the aircraft are visually distinguishable from a remainder of the plurality of ground control messages directed to other aircraft of the set of aircraft.

2. The method of claim 1, further comprising:
establishing, via a wireless communication device, a communication connection to a server, wherein the plurality of secondary sources comprises the server; and obtaining the secondary source data via the communication connection.

3. The method of claim 2, wherein the server stores at least one database including the secondary source data; and
wherein the at least one database comprises at least one of an airline database, registration database, a manufacturer database, and an aircraft situation display to industry (ASDI) historical database.

4. The method of claim 1, wherein the plurality of secondary sources comprises at least an aircraft onboard transponder;
wherein the method further comprises obtaining current aircraft traffic information via the aircraft transponder; and
wherein the secondary source data comprises the current aircraft traffic information.

5. The method of claim 4, wherein the aircraft transponder comprises an Automatic Dependent Surveillance-Broadcast (ADS-B) device.

6. A system for displaying radio voice messages received onboard an aircraft, the system comprising:
system memory;
an aircraft onboard radio, configured to receive the radio voice messages onboard the aircraft;
a display device, configured to present transcriptions of the radio voice messages received onboard the aircraft; and
at least one processor, communicatively coupled to the system memory, the aircraft onboard radio, and the display device, the at least one processor configured to:
receive a plurality of ground control messages comprising speech data via the aircraft onboard radio, wherein the radio voice messages comprise the plurality of ground control messages;
process the speech data using a speech recognition (SR) device onboard the aircraft, to generate SR results;
compare a set of SR hypothetical data to stored identifying information associated with the aircraft, the set of SR hypothetical data comprising the SR results for the plurality of ground control messages received onboard the aircraft;
determine a confidence level associated with accuracy of the set of SR hypothetical data;
when the confidence level is not greater than a predetermined threshold,
determine that one of the plurality of ground control messages comprises a received radio communication including a partial identifier for the aircraft; and
perform post-processing for the set of speech recognition (SR) hypothetical data to increase accuracy of the SR device, by:
obtaining secondary source data from a plurality of secondary sources, wherein the secondary source data comprises at least one of airline databases including an airline code mapped to a corresponding airline name, Aircraft Situation Display to Industry (ASDI) derived historic data, a regulatory registration database, a manufacturer database, ASDI real-time data feeds to the aircraft, Automatic Dependent Surveillance-Broadcast (ADS-B) data received by the aircraft, Traffic Information Service-Broadcast (TIS-B) data, Aircraft Communications Addressing and Reporting System (ACARS) data, Notices to Airmen (NOTAM) data, and Automatic Terminal Information Service (ATIS) data;
comparing the set of SR hypothetical data including the partial identifier to a plurality of aircraft identifiers found in the secondary source data;
identifying one of the plurality of aircraft identifiers using the set of SR hypothetical data and the secondary source data;
determining that the set of SR hypothetical data including the partial identifier indicates the aircraft; and
correcting the set of SR hypothetical data including the partial identifier, based on the secondary source data, to generate a corrected set of SR hypothetical data;
present transcriptions of the plurality of ground control messages received onboard the aircraft, wherein the plurality of ground control messages are directed to a set of aircraft including at least the aircraft;
identify a subset of the plurality of ground control messages including the one of the plurality of aircraft identifiers that indicates the aircraft; and
initiate presentation, via the display device, of the subset using distinguishing visual characteristics, such that the subset of the plurality of ground control messages applicable to the aircraft are visually distinguishable from a remainder of the plurality of ground control messages directed to other aircraft of the set of aircraft.

7. The system of claim 6, further comprising a wireless communication device communicatively coupled to the at least one processor, the wireless communication device configured to:

establish a communication connection to a server, wherein the plurality of secondary sources comprises the server; and obtain the secondary source data via the communication connection.

8. The system of claim 7, wherein the server stores at least one database including the secondary source data; and wherein the at least one database comprises at least one of an airline database, registration database, a manufacturer database, and an aircraft situation display to industry (ASDI) historical database.

9. The system of claim 6, wherein the plurality of secondary sources comprises at least an aircraft onboard transponder;

wherein the at least one processor is further configured to obtain current aircraft traffic information via the aircraft transponder; and wherein the secondary source data comprises the current aircraft traffic information.

10. A non-transitory, computer-readable medium containing instructions thereon, which, when executed by a processor, perform a method comprising:

receiving a radio communication onboard a first aircraft, the radio communication comprising a set of speech recognition data;

comparing the set of speech recognition data to a stored identifier for the first aircraft;

determining a confidence level associated with accuracy of the set of SR hypothetical data; and when the confidence level is not greater than a predetermined threshold, determining that the radio communication includes a partial identifier for the first aircraft; and performing post-processing of the set of speech recognition data to increase accuracy of a speech recognition device onboard the first aircraft, by:

obtaining secondary source data associated with a plurality of aircraft comprising at least the first aircraft, wherein the secondary source data comprises at least one of airline databases including an airline code mapped to a corresponding airline name, Aircraft Situation Display to Industry (ASDI) derived historic data, a regulatory registration database, a manufacturer database, ASDI real-time data feeds to the aircraft, Automatic Dependent Surveillance-Broadcast (ADS-B) data received by the aircraft, Traffic Information Service-Broadcast (TIS-B) data, Aircraft Communications Addressing and Reporting System (ACARS) data, Notices to Airmen (NOTAM) data, and Automatic Terminal Information Service (ATIS) data;

comparing the speech recognition data including the partial identifier to a plurality of aircraft identifiers in the secondary source data;

identifying one of the plurality of aircraft identifiers that includes the partial identifier, based on the comparing;

determining that the radio communication is associated with the first aircraft, based on identifying the partial identifier; and correcting the speech recognition data including the partial identifier, based on the secondary source data, to generate a corrected set of speech recognition data;

presenting transcriptions of a plurality of radio communications received onboard the aircraft, wherein the plurality of radio communications are directed to a set of aircraft including at least the first aircraft, and wherein the plurality of radio communications comprises the radio communication;

identifying a subset of the plurality of radio communications including the one of the plurality of aircraft identifiers that indicates the first aircraft; and presenting, via a display device onboard the aircraft, a subset of the plurality of radio communications associated with the first aircraft using distinguishing visual characteristics, such that the subset of the plurality of radio communications applicable to the first aircraft are visually distinguishable from a remainder of the plurality of radio communications directed to other aircraft of the set of aircraft.

11. The non-transitory, computer-readable medium of claim 10, wherein the method further comprises:

establishing, via a wireless communication device, a communication connection to a server, wherein the plurality of secondary sources comprises the server; and obtaining the secondary source data via the communication connection.

12. The non-transitory, computer-readable medium of claim 11, wherein the server stores at least one database including the secondary source data; and wherein the at least one database comprises at least one of an airline database, registration database, a manufacturer database, and an aircraft situation display to industry (ASDI) historical database.

13. The non-transitory, computer-readable medium of claim 10, wherein the plurality of secondary sources comprises at least an aircraft onboard transponder;

wherein the method further comprises obtaining current aircraft traffic information via the aircraft transponder; and wherein the secondary source data comprises the current aircraft traffic information.

* * * * *